April 16, 1935. H. H. RUMPEL Re. 19,538

INTERCONE MILL

Original Filed Sept. 17, 1928 2 Sheets-Sheet 1

INVENTOR.
Harvey H. Rumpel,
BY
Morsell, Kenny & Morsell
ATTORNEYS

April 16, 1935. H. H. RUMPEL Re. 19,538

INTERCONE MILL

Original Filed Sept. 17, 1928 2 Sheets-Sheet 2

INVENTOR,
Harvey H. Rumpel,
BY
Morsell, Keeney & Morsell
ATTORNEYS

Reissued Apr. 16, 1935

Re. 19,538

UNITED STATES PATENT OFFICE 19,538

INTERCONE MILL

Harvey H. Rumpel, Milwaukee, Wis., assignor to Smith Engineering Works, Milwaukee, Wis., a corporation of Wisconsin Original No. 1,945,791, dated February 6, 1934, Serial No. 306,381, September 17, 1928. Application for reissue December 29, 1934, Serial No. 759,771

8 Claims. (Cl. 83—10)

This invention relates to improvements in intercone mills of the eccentric rolling motion type.

It is one of the objects of the present invention to provide an intercone mill in which the crusher head has a rolling, eccentric or gyratory motion while it is bodily rotated by the shaft into which it has its bearing, and cooperates with the relatively fixed crushing member or concave.

A further object of the invention is to provide an intercone mill having a relatively fixed crushing member which is arranged to yield under undue pressure.

A further object of the invention is to provide an intercone mill having a sleeve shaft formed with an eccentric and obliquely extending conical bore for receiving the conical shaft of the movable crushing cone or head, and in which the crushing strain from the head is transmitted to the frame through the sleeve shaft.

A further object of the invention is to provide an intercone mill in which the central portion of the crushing head is provided with an extension which projects above the upper crushing edge of the relatively fixed crushing member of concave and aids in the feeding operation by agitating the material in the portion of the mill above the concave.

A further object of the invention is to provide an intercone mill in which the crushing head or cone is supported upon a conical roller bearing which takes the crushing strain between the head and the shaft, and another conical roller bearing to take the end thrust strain of the main head supporting shaft.

A further object of the invention is to provide an intercone mill in which the crushing cone is provided with a dust ring of part spherical shape which is yieldingly connected to the lower portion of the cone within the confines of a cone apron and bears upon a part spherical and enclosing frame part to prevent entry of dust to the bearings.

A further object of the invention is to provide an intercone mill in which the cone mantle is secured to the cone head by a lining of zinc, said zinc lining also being utilized to form a key to prevent independent rotation of the mantle on the head.

A further object of the invention is to provide an intercone mill in which the cone mantle is formed of two parts interlocked together to prevent independent rotation and to permit replacement of either part when worn.

A further object of the invention is to provide an intercone mill having the upper portion of its shaft threaded to receive a nut which forces the mantle downwardly on the head, the nut and the shaft end being provided with keyways to permit turning the nut and the insertion of a key to lock the nut to the shaft.

A further object of the invention is to provide an intercone mill having a shield for the shaft nut which is of cup shape form to receive stone or dust to eliminate wear from the nut.

A further object of the invention is to provide an intercone mill which is of simple construction, is strong and durable and is well adapted for the purpose described.

With the above and other objects in view, the invention consists of the improved intercone mill and its parts and combinations as set forth in the claims and all equivalents thereof.

In the accompanying drawings in which the same reference characters indicate the same parts in all of the views.

Figure 1:
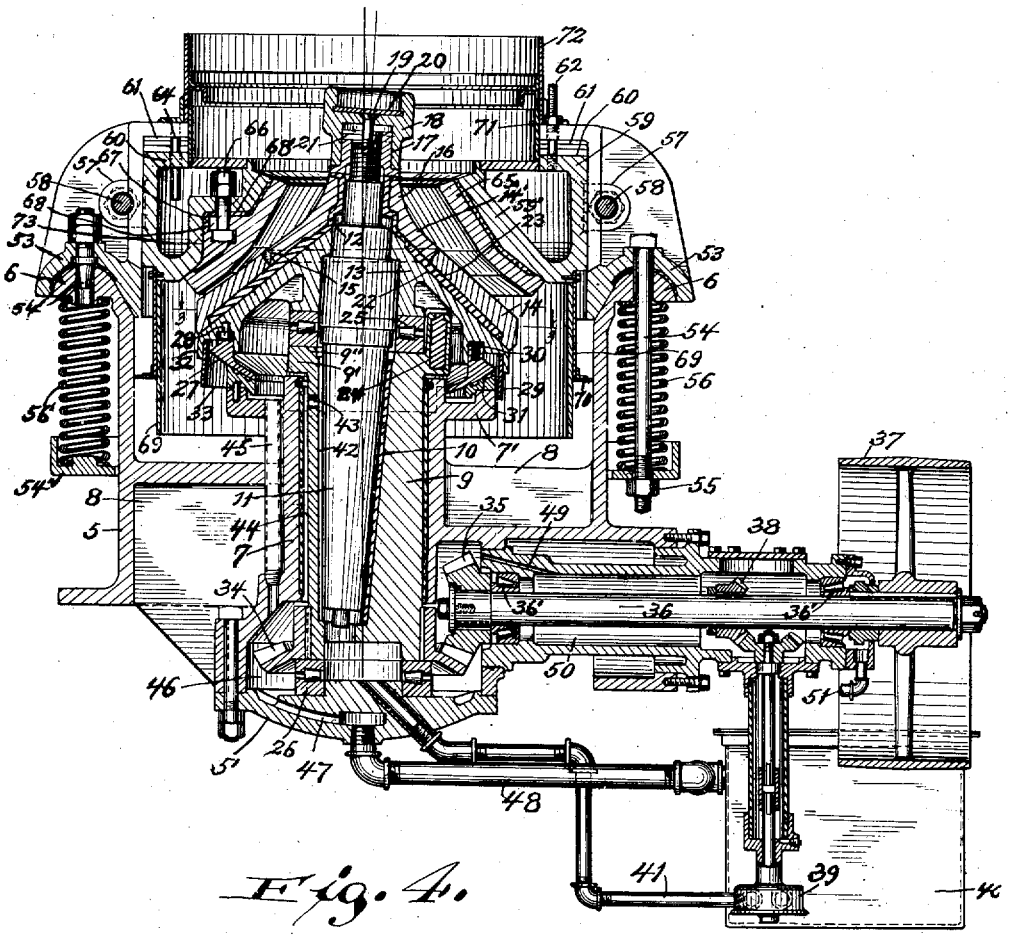
Fig. 1 is a vertical sectional view through the improved mill.
Figure 4:
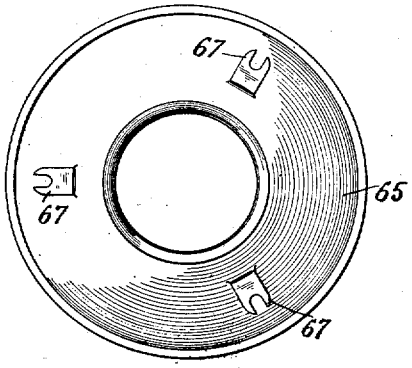
Fig. 4 is a top view of the concave grinding member removed from the mill.
Figure 2:
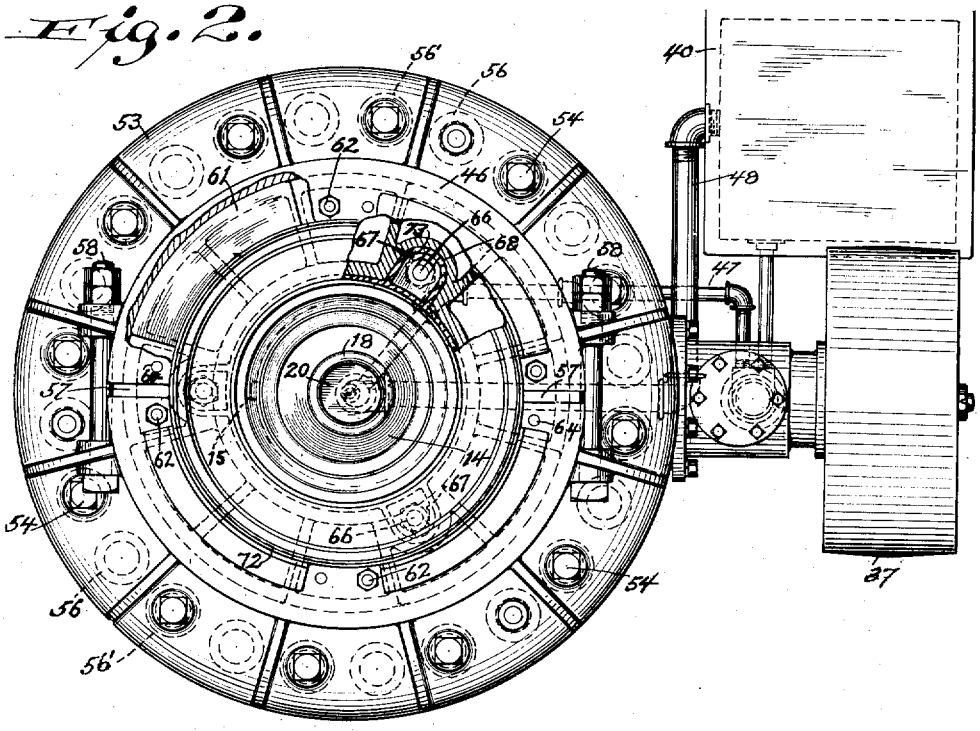
Fig. 2 is a top view thereof with parts broken away to show interior construction.
Figure 3:
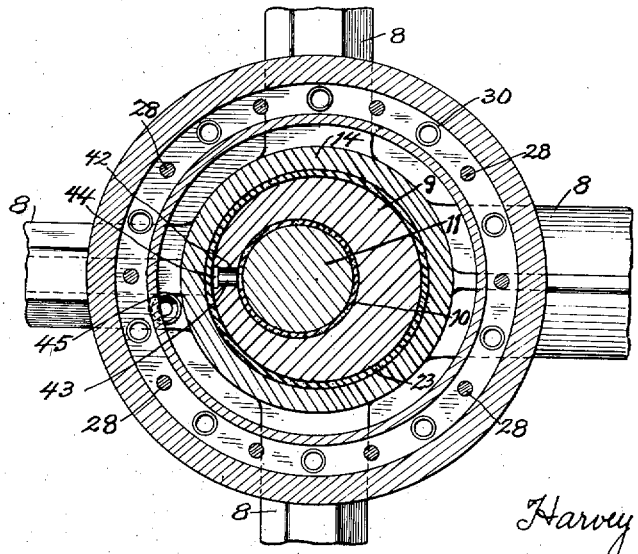
Fig. 3 is a horizontal sectional view thereof taken on line 3—3 of Fig. 1 and on a larger scale.

Referring to the drawings, the numeral 5 indicates a lower frame or casing which is of cylindrical form and is provided with an upper and outwardly extending flange 6. The casing is also provided with an inner bearing or hub portion 7 connected to the outer portion by radial ribs 8. A vertical tubular sleeve 9 having an enlargement 9′ at its upper end is journaled in the inner bearing and is formed with a tapered obliquely extending eccentric bore 10, the upper end portion 9″ of the sleeve being formed in a plane extending at right angles to the eccentric bore. A tapered crusher shaft 11 is journaled in the bore 10 and is formed with upper shouldered portions 12 upon which is rigidly secured a tapered crusher head 13 having a two part frustro-conical mantle 14 mounted thereon. The mantle 14 is divided horizontally to form the two parts and the upper portion 14′ is locked against independent rotation by a tongue and recess connection 15. The upper mantle portion 14′ is formed with an upward extension 16 which is engaged by a nut 17 threaded on the upper end of the shaft 11 to clamp the mantle on the crusher head. A cap 18 extends around the nut to protect the same and is held in position by a screw 19 threaded into the upper end of the shaft. A disk 20 recessed into the upper portion of the cap protects the head of the screw, and the recess is of sufficient depth to hold dust or pieces of stone to in turn protect the disk. The nut 17 which is of the castellated type is locked in adjusted position on the shaft by a key 21 which extends through the grooves of the nut castellations and a corresponding groove in the adjacent shaft end. The inner surface of the mantle is left in rough form while the outer face of the crusher head is formed with one or more keyways 22, and zinc 23 in a molten form is poured between the mantle and the head and portions of the shaft 40 to firmly bind the parts together. A counter-weight 24 is mounted on one side of the sleeve at its upper end to counterbalance the weight of the eccentric location of the crusher head with relation to the sleeve. The crusher head is supported upon a conical roller bearing 25 which is interposed between the head and the sleeve shaft 9, and likewise the lower end of the sleeve shaft 9 is supported on a similar bearing 26 between the sleeve shaft and the frame, so that the downward crushing strain is borne by the eccentric sleeve and from the sleeve to the frame, and thus materially differs from crushers in which the strain is borne by the shaft of the head.

An oil or dust ring 27 is loosely fitted in the lower part of the head and is kept from turning independently of the head by pins 28. In addition to its weight, it is pressed against a removable ring 29 by springs 30. The ring 29 is carried by the bearing 7 and the adjacent bearing faces of each ring are of spherical form to permit eccentric turning movement of the head. A packing 31 is provided to prevent entrance of dust into the bearing and oil from getting out of the bearing. The outer depending flange 32 of the head, which also serves to prevent dust from entering the bearing, is provided with an extension or apron in the form of a rubber belt 33 which extends around the flange 7' of the inner bearing 7 for the same purpose.

A bevel gear 34 mounted on the lower end portion of the sleeve 9 is in mesh with and driven by a bevel pinion 35 which is mounted on the inner end of a horizontal driving shaft 36. Said driving shaft is journaled in roller bearings 36' and extends through the frame or casing and at its outer end is provided with a pulley 37 for connection with a source of power, not shown. The horizontal shaft also has a geared connection 38 with an oil pump 39 for forcing oil to various portions of the mill. The pump 39 is connected to an oil tank 40 and draws the oil therefrom and forces it into the eccentric bore of the vertical sleeve by means of the pipe 41. The sleeve is formed with a duct 42 and a side aperture 43 to permit the passage of the oil to the upper roller bearing 25 and the engaging rings. The crusher shaft, the lower bearing, the gears and the bearings of the drive shaft are also lubricated from the same source. The sleeve 9 is also provided with an outer duct 44 for lubricating the bearing of the sleeve. A pipe 45 extending from the flange 7' to the lower portion of the inner bearing permits the return of the oil to the gear chamber 46, duct 47 and return pipe 48 to the oil tank 40, thus providing for a constant circulation of oil through the mill. The pipes 41 and 48 are connected to and the duct 47 is formed in a cap member 5' bolted to and forming part of the main frame 5.

A duct 49 permits the oil to flow from the gear chamber 46 to the shaft and gear chamber 50 to lubricate the bearings of said shaft, and a return pipe 51 which may connect to the oil tank, returns the oil to the tank.

An upper housing or frame 52 is formed with an annular rounded flange 53 which extends over and engages the upper rounded flange 6 of the main frame. Bolts 54 extending downwardly through both flanges 6 and 53, and also through a floating ring 54 which surrounds the main frame 5, are provided with nuts 55 at their lower ends. Coiled springs 56 surrounding the bolts and interposed between the flange 6 and the floating ring yieldingly hold the upper housing in position. Springs 56' extending around pins 54' depending from the flange 53 are also interposed between the flange 6 and the floating ring 54 to assist the springs 56 in yieldingly holding the upper frame or housing member in position. The upper portion of the housing is split radially or transversely, as indicated by the numeral 57, to permit a slight give of said parts, and transverse bolts 58 which extend through the split portions draw the two parts into clamping engagement with the upper or concave frame member 59 around which it extends. The portion of the concave member surrounded by the housing is of cylindrical form, and is provided with an inwardly extended annular flange 60 for receiving segmental shims 61 which are placed at spaced intervals around the flange and between the flange and the housing to adjust the height of the concave with relation to the mantle 14. Bolts 62 adjustably support the weight of the concave member 59, and pins 64 serve as guides to hold the parts in engagement. Said bolts and pins are positioned in the spaces between the end portions of the shims.

An outer or concave crushing member 65 surrounds the grinding head in spaced relation and is secured to the inner concave portion 59' of the concave frame member 59 by bolts and nuts 66 which pass through radial lugs 67 formed on the outerside of the concave crushing member 65, to permit replacement of said crushing member when worn. The lugs 67 extend into recesses 68 formed in the concave member portion 59'. The contacting face portions of the parts 59' and 65 are ground or machined to space the lugs 67 from the walls of the recesses, and said spaces are filled with pieces of wood 68' or other easily compressible material as wood, to permit drawing the bolts tight in the event that the zinc packing material should give way.

The lower portion of the concave member 59 is provided with an apron 69 having a yielding ring packing 70 mounted on its outer side which bears against the inner wall of the casing 5 to slidingly seal the connection therebetween. The upper inner portion of the concave flange member 60 is provided with an upstanding collar 71 against which the inner upper edges of the concave housing bears.

A cylindrical support and feed spout 72 is connected to the upper portion of the concave frame member 59 and the collar 71 and extends upwardly therefrom to direct the material into the space between the concave 65 and the mantle 14. All spaces between parts where dust or crushed material may gather are filled with zinc, rubber or other packing material 73 to protect said parts.

The axial center lines of the tubular shaft 9 and the crusher shaft 11 cross each other at a point approximately in line with the upper edge portion of the concave 65, and as the upper end portion of the cone member projects comparatively a considerable distance above this point of intersection, it will have a circular oscillatory movement above the crusher members and within the feed spout, and tend to agitate the material within the spout and cause a positive feed of material between the crusher members, thus providing a more efficient crusher.

In operation, the material to be crushed is fed to the machine through the feed spout, and is crushed between the head and the concave. Due to the fact that the tubular sleeve shaft within the frame revolves and the crusher head shaft is eccentrically and obliquely journaled in the sleeve, an eccentric or gyratory action is imparted to the crusher head by the shaft upon which the head is mounted. Due to the obliquely extending eccentric portion of the crusher shaft, which carries the crusher head, the rotation of the sleeve shaft will cause the crusher head to turn in a path eccentric to the concave, so that portions of the head in moving closer to the concave will crush the material therebetween, and the head may in some portions of its movement be rotated by engaging the material. If the crushing space between the two crushing members is overloaded with material, or lumps of material too hard to be crushed get into the said space, the increased pressure will overcome the pressure of the concave member springs and permit the concave member to tilt upwardly and enlarge the space, and the material will then be worked from between the crushing members, and said concave member will then assume its regular crushing position as shown.

As the upper end portion 9'' of the sleeve extends at an angle to the lower end of the sleeve, the said upper angular portion is somewhat like a cam which carries one side face portion of the crusher head at a higher plane than the opposite side face portion, with the result that in being carried around by the sleeve, this higher plane portion wedgingly engaged the material and more efficiently crushed the same. Furthermore, the lubrication of the parts subjected to the greatest strain eliminates considerable friction and conduces to greater efficiency.

From the foregoing description, it will be seen that the intercone mill is of simple construction, and is well adapted for the purpose described.

What I claim as my invention is:

1. In a crusher a frame, an outer crushing member supported by said frame, an inner crushing member cooperating with said outer member to form a crushing chamber, a rotary eccentric journaled in said frame concentrically of the central crusher axis and having a bore drivingly cooperable with said inner member to relatively gyrate said members, said eccentric bore having an axis which is inclined relative to the central axis of rotation of said eccentric, a thrust bearing supporting said inner member upon said eccentric, and another thrust bearing supporting said eccentric from said frame, said first mentioned bearing lying in a plane perpendicular to said inclined bore axis and the other being perpendicular to the central eccentric axis.

2. In a crusher, a frame, a crushing concave supported by said frame a crushing head cooperating with said concave to form a crushing chamber, a rotary eccentric journaled in said frame concentrically of the central crusher axis and for relatively gyrating said head and concave, said eccentric having a bore the axis of which is inclined relative to and intersects the central axis of rotation of said eccentric above the latter, means rigidly associated with said head for imparting driving motion from said eccentric to said head and for rotatably confining the same concentrically of said bore, a thrust bearing supporting said head upon said eccentric, and another thrust bearing supporting said eccentric from said frame, said first mentioned bearing lying in a plane perpendicular to said inclined bore axis and the other being perpendicular to the central eccentric axis.

3. In a crusher, a frame, an outer crushing member supported by said frame, an inner crushing member cooperating with said outer member to form a crushing chamber, a rotary eccentric journaled in said frame concentrically of the central crusher axis and beneath said inner member for gyrating the latter relative to said outer member, said eccentric having a bore the axis of which is inclined with respect to the central axis of rotation of said eccentric, a shaft secured to said inner member and journaled in said eccentric bore, a thrust bearing supporting said inner member upon the upper end of said eccentric, and another thrust bearing supporting the lower end of said eccentric from said frame, said bearings being disposed respectively in planes perpendicular to said inclined bore axis and to said central eccentric axis.

4. In a crusher, a frame, a crushing concave supported by said frame, a crushing head cooperating with said concave to form a crushing chamber, a rotary eccentric journaled in said frame concentrically of the central crusher axis and beneath said head for gyrating the latter relative to said concave, said eccentric having an outer annular bearing surface and an inner bore generated about axes which intersect above said eccentric, a shaft depending from said head and journaled in said bore for rotatably and drivingly confining said head concentrically of said bore, a thrust bearing surrounding said shaft and disposed between a lower portion of said head and an upper portion of said eccentric, and another thrust bearing supporting said eccentric from said frame.

5. In a crusher, a frame, a crushing concave supported by said frame, a crushing head cooperating with said concave to form a crushing chamber, a rotary eccentric journaled in said frame concentrically of the central crusher axis and beneath the discharge end of said chamber, said eccentric cooperating with said head to gyrate the same relative to said concave and having an outer cylindrical bearing surface and an inner bore generated about axes which intersect above said eccentric, a shaft rigidly attached to and depending from said head and journaled in said bore for rotatably and drivingly confining said head concentrically of said bore, a thrust bearing surrounding said shaft and disposed between a lower portion of said head and an upper portion of said eccentric, and another thrust bearing between the lower portion of said eccentric and said frame.

6. In a crusher, a frame, an outer crushing member supported by said frame, an inner crushing member cooperating with said outer member to form a crushing chamber, a rotary eccentric journaled concentrically of the central crusher axis and having a bearing surface drivingly cooperable with said inner member to relatively gyrate said members, said bearing surface having an axis which is inclined relative to the central crusher axis, a thrust bearing supporting said inner member upon said eccentric, and another thrust bearing supporting said eccentric from said frame, said bearings lying in relatively inclined planes.

7. In a crusher, a frame, an outer crushing member supported by said frame, an inner crushing member cooperating with said outer member to form a crushing chamber, a rotary eccentric journaled concentrically of the central crusher axis and having a bearing surface drivingly cooperable with said inner member to relatively gyrate said members, said bearing surface having an axis which is inclined relative to the central crusher axis, a thrust bearing disposed concentric with said inclined axis for supporting said inner member upon said eccentric, and another thrust bearing disposed concentric with the central crusher axis for supporting said eccentric from said frame.

8. In a crusher, a frame, a concave supported by said frame, a head cooperating with said concave to form a crushing chamber, a rotary eccentric journaled concentrically of the central crusher axis and having inner and outer eccentrically disposed bearing surfaces, one of said surfaces being drivingly cooperable with said head to gyrate the same relative to said concave and said surface having an axis which is inclined relative to the central crusher axis, an annular thrust bearing formed concentric with said inclined axis for supporting said head upon said eccentric, and another annular thrust bearing formed concentric with the central crusher axis for supporting said eccentric from said frame.

HARVEY H. RUMPEL.